United States Patent Office 3,366,688
Patented Jan. 30, 1968

3,366,688
PROCESS FOR THE PREPARATION OF α,α-DISUB-STITUTED-γ-HYDROXYAMINES
William W. Hargrove, Indianapolis, Ind., assignor to Eli Lilly and Company, Indianapolis, Ind., a corporation of Indiana
No Drawing. Continuation-in-part of application Ser. No. 232,309, Oct. 22, 1962. This application Sept. 17, 1964, Ser. No. 397,269
1 Claim. (Cl. 260—584)

ABSTRACT OF THE DISCLOSURE

α,α-Disubstituted-γ-hydroxypropylamines are prepared by the action of sodium borohydride in an ethereal solvent on α,α-disubstituted aminopropenes.

---

This application is a continuation-in-part of my application, Ser. No. 232,309, filed Oct. 22, 1962, now abandoned.

This invention relates to novel α,α-disubstituted-γ-hydroxypropylamines and to a process for their preparation.

The compounds provided by this invention can be represented by the following formula:

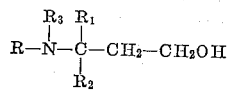

(I)

wherein R is a member of the group consisting of $C_1$–$C_5$ alkyl, monocyclic and bicyclic aryl, $C_3$–$C_8$ cycloalkyl, and monocyclic aryl-substituted $C_1$–$C_5$ alkyl; $R_1$ and $R_2$, when taken singly, are members of the group consisting of $C_1$–$C_5$ alkyl, monocyclic and bicyclic aryl, and $C_3$–$C_8$ cycloalkyl; $R_1$ and $R_2$, when taken together with the carbon atom to which they are attached, are members of the group consisting of $C_3$–$C_8$ cycloalkyl and monocyclic aryl-substituted $C_3$–$C_8$ cycloalkyl; and $R_3$ is a member of the group consisting of hydrogen, methyl and ethyl.

Also included within the scope of this invention are the acid addition salts of the α,α-disubstituted-γ-hydroxypropylamines represented by the above formula formed with pharmaceutically acceptable acids, as illustrated below, which salts can be incorporated in pharmaceutical extending media, liquid or solid, for the preparation of therapeutically useful compositions.

In Formula I above, when R, $R_1$ and $R_2$ are $C_1$–$C_5$ alkyl radicals, they can be, illustratively, methyl, ethyl, isopropyl, n-butyl, sec.-butyl, n-amyl, t-amyl, n-propyl, t-butyl, 3-methyl-2-butyl, neopentyl, and the like.

When R, $R_1$ and $R_2$ represent monocyclic and bicyclic aryl, they can be any of the ring systems fulfilling the usual criteria for aromaticity. Examples of such aromatic ring systems are phenyl, napthyl, thienyl, furyl, pyridyl, pyrazolyl, pyrimidyl, and the like. Also included within the scope of the term "monocyclic and bicyclic aryl" are monocyclic and bicyclic aromatic rings containing conventional substituents, such substituents being, for example, halogens such as chlorine, bromine, and fluorine; $C_1$–$C_5$ alkyl groups such as those listed above; halo-substituted lower alkyl groups such as trifluoromethyl, chlorethyl, heptafluoropropyl, pentachlorethyl and the like; and lower alkoxy groups such as methoxy, ethoxy, n-propoxy, isopropoxy, and the like. Thus, other illustrative groups included within the term "aryl" as employed in this disclosure are β-fluoronapthyl, 2-chlorophenyl, 2-hydroxyfuryl, 2-butyl-3-pyridyl, 3-(3-methyl-2-butyl)pyridyl, o-, m-, and p-bromophenyl, p-tolyl, o-isoamylphenyl, m-xylyl, p-iodophenyl, m-trifluoromethylphenyl, pentafluoroethylphenyl, trichloromethylphenyl, p-(n-hexyl)phenyl, p-ethoxyphenyl, 2-isopropylpyridyl, nitrothienyl, 3-methylfuryl, anisyl, and α-t-butyl-β-naphthyl.

In the above formulas, when R, $R_1$ and $R_2$, or $R_1$ and $R_2$ taken together with the carbon atom to which they are attached, represent $C_3$–$C_8$ cycloalkyl radicals, they can be, illustratively, cyclopropyl, cyclobutyl, cyclopentyl, cyclohexyl, cycloheptyl, cyclo-octyl, methylcyclopentyl, ethylcyclohexyl, and the like. $R_1$ and $R_2$, when taken together with the carbon atom to which they are attached, can also form a cycloalkyl ring substituted with an aromatic radical, such as those listed above. These aromatic radicals can be attached to the cycloalkyl ring by a conventional single valence bond, thus yielding groups such as α-phenylcyclohexyl and β-(p-chlorophenyl)cyclopentyl. In addition, a given aryl radical can be attached by more than one valence to the cycloalkyl ring, or the cycloalkyl ring can exist as an intermediate ring between two aromatic rings. Thus, illustrative aromatic substituted cycloalkyl radicals which R and $R_1$, when taken together with the carbon atom to which they are attached, can represent include tetralinyl, indanyl, fluorenyl, dihydroanthranyl, phenanthryl, thioxanthyl, xanthyl, dibenzocycloheptadienyl, and the like.

R in the above formula can also represent $C_1$–$C_5$ alkyl bearing a monocyclic aryl substituent, such as illustratively, benzyl, phenethyl, 2-phenylpropyl, 1-phenylethyl, 3-phenyl-2-pentyl, 1-tolylethyl, m-chlorobenzyl, homoveratryl, and the like, the permissible aryl radicals substituted in the alkyl chain being, in general, those defined above for R, $R_1$ and $R_2$ when they represent monocyclic aryl.

The compounds of this invention can be prepared according to Reaction Sequence 1 below.

REACTION SEQUENCE 1

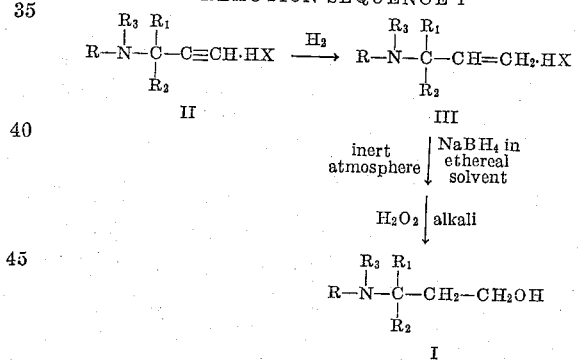

wherein R, $R_1$, $R_2$ and $R_3$ have the same significance as hereinabove and X is an anion. According to Reaction Sequence 1, an acid addition salt of an appropriate aminoacetylene (II) is semihydrogenated to the corresponding aminoethylene derivative (III) by the procedure set forth in Easton and Hennion, U.S. Patent 3,168,567, issued Feb. 2, 1965. The aminoacetylenes are furnished either, when $R_1$ and $R_2$ are alkyl radicals, by the procedure set forth in Easton and Hennion, U.S. Patent 3,285,913, issued Nov. 15, 1966, U.S. Patent 3,331,846, issued July 18, 1967 and U.S. Patent 3,337,625, issued Aug. 22, 1967, or, when either $R_1$ or $R_2$ represents an aryl group, by the procedure set forth in the copending application of Nelson R. Easton and Robert D. Dillard, Ser. No. 604,616, filed Dec. 27, 1966. The aminoethylene compound (III), in the form of an acid addition salt, is then reacted with sodium borohydride in diglyme (diethylene glycol dimethyl ether) solution in an inert atmosphere. The intermediate organo-boron compound thus produced is decomposed by alkaline hydrogen peroxide to yield the desired γ-hydroxypropylamine (I).

Although Reaction Sequence 1 has been illustrated with reference to an acid addition salt of the amine as the preferred starting material, it is possible to employ the free base in its stead. When the free base is employed, however, it is necessary to add another acid, preferably a Lewis acid, such as either aluminum chloride or boron trifluoride, in order to enable the reaction to proceed.

In carrying out the second step of the above reaction sequence, I generally employ equimolar quantities of amine salt and sodium borohydride, although the stoichiometry would indicate that one mole of borohydride would react with three moles of the amine. Thus, a large excess of diborane is always present. The solvent employed for the reaction is usually diglyme although other ethereal solvents, which are free from groups capable of undergoing reaction with sodium borohydride, may also be employed, as for example, tetrahydrofuran, diethyl ether, triethylene glycol dimethyl ether (triglyme), and the like. Solubility of the reactants in a particular solvent usually governs the choice of solvent rather than the boiling point of the solvent, since the reaction is readily carried out at temperatures between 0° C. and 100° C.

Acid addition salts of $\alpha,\alpha$-disubstituted-$\gamma$-hydroxyamines represented by (I) above are prepared as follows: A solution of the amine is mixed with an equivalent of an acid, either as such or in solution. If the acid addition salt thus formed is insoluble in the solvent or solvents employed, it precipitates and is isolated by filtration or centrifugation. On the other hand, if the acid addition salt is soluble in the solvent employed, the acid addition salt is recovered in solid form by evaporation of the solvent. When an acid addition salt is formed with a gaseous acid, such as hydrogen chloride, an excess of the acid can be employed, since the excess can be readily removed by volatilization.

The preparation of a typical acid addition salt, specifically a hydrochloride salt, is carried out as follows: A solution of the amine is prepared in anhydrous ether and an ethereal solution of hydrogen chloride is added thereto, the quantity of hydrogen chloride present being in excess of that needed to react with the equivalents of amine present. The $\alpha,\alpha$-disubstituted-$\gamma$-hydroxyamine hydrochloride thus formed is, in general, insoluble in the ethereal solution and is separated by filtration. The separated acid addition salt is satisfactorily purified by recrystallization from a mixture of anhydrous ethanol and ethyl acetate, although other solvents and solvent mixtures are equally operative.

Other pharmaceutically acceptable acids, which can form acid addition salts with amines falling within the scope or formula (I) above, include inorganic acids such as phosphoric acid, phosphorous acid, nitric acid, sulfuric acid, hydrobromic acid, hydriodic acid, boric acid, and the like, as well as organic acids such as benzoic acid, acetic acid, butyric acid, malic acid, maleic acid, tartaric acid, citric acid, azelaic acid, naphthlenesulfonic acid, phenylarsonic acid, and the like.

The compounds of this invention are useful in lowering the blood pressure of experimental animals made hypertensive according to standard laboratory procedures. In addition, the compounds are useful intermediates for the synthesis of $\alpha,\alpha$-disubstituted azetidines. In converting the $\alpha,\alpha$-disubstituted-$\gamma$-hydroxypropylamines of this invention to $\alpha,\alpha$-disubstituted azetidines, the first step involves the conversion of the hydroxyl group to a halogen by means of a standard halogenating agent such as thionyl chloride, phosphorous pentachloride, thionyl bromide, phosphorous oxychloride, phosphorous and iodine, and the like. The $\alpha,\alpha$-disubstituted-$\gamma$-halomaine thus prepared is then treated with excess base, whereby a typical ring closure reaction takes place with the formation of the azetidine ring and the elimination of the elements of a hydrogen halide. The $\alpha,\alpha$-disubstituted azetidines thus produced are also useful as hypotensive agents.

This invention is further illustrated by the following specific examples:

EXAMPLE I

*Preparation of 3-t-butylamino-3-methyl-1-butanol*

One and twenty-eight hundredths grams of sodium borohydride were dissolved in 40 ml. of anhydrous diglyme. Three grams of 3-t-butylamino-3-methyl-1-butene hydrochloride were added to the solution in portions. The resulting reaction mixture was allowed to remain at ambient room temperature for about 48 hours. Ten milliliters of water and 10 ml. of 3 N aqueous sodium hydroxide were then added, followed by 40 ml. of 15 percent hydrogen peroxide, thus forming 3-t-butylamino-3-methyl-1-butanol. The resulting reaction mixture was thrice extracted with 200 ml. portions of ether. The ether extracts were combined and washed twice with 100 ml. of 20 percent hydrochloric acid, whereby 3-t-butylamino-3-methyl-1-butanol passed into the aqueous layer as the hydrochloride salt. The aqueous layer was concentrated to a thick syrup by evaporation in vacuo, leaving as a residue 3-t-butylamino-3-methyl-1-butanol hydrochloride.

Following the above procedure, N-t-butyl-N-methyl 3-amino-3-methyl-1-butene hydrochloride was reacted with sodium borohydrides in diglyme to yield a tris(aminoalkyl)borane. Treatment of this compound with alkaline hydrogen peroxide yielded N-t-butyl-N-methyl 3-amino-3-methyl-1-butanol, which distilled at about 114–115° C./10.5 mm. Hg. The corresponding hydrochloride salt was extremely hygroscopic.

The following table lists other $\beta$-amino-alkenes which have been transformed to the corresponding $\gamma$-amino-alcohols by the above process.

TABLE I

| Starting Material | Final Product | M.P. of hydrochloride salt |
| --- | --- | --- |
| 3-isopropylamino-3-methyl-1-butene | 3-isopropylamino-3-methyl-1-butanol | 108–110° C. |
| 3-ethylamino-3-methyl-1-pentene | 3-ethylamino-3-methyl-1-pentanol | Hygroscopic. |
| 3-t-amylamino-3-methyl-1-butene | 3-t-amylamino-3-methyl-1-butanol | (¹). |
| N,N-diethyl 3-amino-3-methyl-1-butene | N,N-diethyl 3-amino-3-methyl-1-butanol | 105–106° C. |
| 3-isopropylamino-3,4-dimethyl-1-pentene | 3-isopropylamino-3,4-dimethyl-1-pentanol | 108.5–110° C. |

¹ B.P. of free base=148/53 mm. Hg; $n^{25}$=1.459.

EXAMPLE II

*Preparation of 3-t-butylamino-3-methyl-1-butanol*

Thirty-two grams of aluminum chloride were added to 140 ml. of anhydrous diglyme in a 500 ml. three-necked, round-bottomed flask equipped with stirrer, dropping funnel, and inlet tube. The solution was cooled to about 0° C. The flask was flushed with nitrogen and a steady stream of nitrogen was passed through the flask during the course of the ensuing reaction. Next, a solution containing 2.68 g. of sodium borohydride in 57 ml. of anhydrous diglyme was added to the stirred aluminum chloride solution. Ten grams of 3-t-butylamino-3-methyl-1-butene were added to the reaction mixture over a half-hour period. A solution temperature of about 0° C. was maintained during both the above operations. The cooling means were then removed from around the reaction flask, and the reaction mixture was stirred for another two hours, during which time the temperature of the reaction mixture gradually reached ambient room temperature. Stirring was stopped, and the reaction mixture was then warmed on a stream bath at about 100° C. for about three hours, still under an atmosphere of nitrogen. Ten milliliters of water were added to the stirred reaction mixture, followed by 70 ml. of 3N sodium hydroxide, and finally, 22 g. of 30 percent hydrogen peroxide. Stirring was continued for a period of about 16 hours. The reaction mixture was then diluted with two volumes of ether, thus forming an organic layer, which was separated. The basic aqueous layer was extracted three times with ether. The organic layer and ethereal extracts were combined and dried, and the ether was removed therefrom by evaporation in vacuo. The residue, comprising 3-t-butylamino-3-methyl-1-butanol formed in the above reaction, was dissolved in ethyl acetate and a slight excess of ethanolic hydrogen chloride was added to the solution, thus forming 3-t-butylamino-3-methyl-1-butanol hydrochloride. The compound melted at 125.5–127° C. after recrystallization from methyl ethyl ketone.

*Analysis.*—Calc.: C, 56.52; H, 11.33; N, 7.16. Found: C, 56.20; H, 11.41; N, 7.21.

The above reaction was repeated except that the residue remaining after removal of ether from the combined ether extracts was distilled. 3-t-butylamino-3-methyl-1-butanol free base thus obtained boiled at about 76° C./4 mm. Hg; $n_D^{25}=1.447$.

Following the above procedure, 3-isopropylamino-3-methyl-1-pentene was reacted with a mixture of sodium borohydride and boron trifluoride etherate in diglyme solution under a nitrogen atmosphere. The product of this reaction was treated with hydrogen peroxide in the presence of dilute aqueous sodium hydroxide, thus forming 3-isopropylamino-3-methyl-1-pentanol.

Certain of the novel compounds of this invention can be purified more readily in the form of an acyl ester, as illustrated in the following example.

EXAMPLE III

*Purification of 3-t-butylamino-3-methyl-1-butanol hydrochloride*

Twenty milliliters of acetic anhydride were added to the thick syrup of 3-t-butylamino-3-methyl-1-butanol hydrochloride obtained in Example I. The resulting mixture was refluxed for about one hour. The excess acetic anhydride was removed by evaporation in vacuo, and the syrupy residue was induced to crystallize by scratching. 3-t-butylamino-3-methyl-1-butyl acetate hydrochloride thus prepared melted at about 140–141° C. after recrystallization from methyl ethyl ketone.

Two and four tenths grams of 3-t-butylamino-3-methyl-1-butyl acetate hydrochloride were dissolved in an excess of ethanolic hydrogen chloride, and the resulting mixture was heated at refluxing temperatures for about two hours. The solvent was removed by evaporation in vacuo, and the resulting syrup, comprising 3-t-butylamino-3-methyl-1-butanol hydrochloride, was crystallized by scratching. The compound melted at about 124–126° C. after recrystallization from methyl ethyl ketone.

EXAMPLE IV

*Preparation of 3-t-butylamino-3-methyl-1-pentanol*

Following the procedure of Example I, 3-t-butylamino-3-methyl-1-pentene hydrochloride was reacted with sodium borohydride in diglyme to yield tris(3-t-butylamino-3-methylpentyl)borane. The resulting product was treated with 15 percent hydrogen peroxide in the presence of base to yield 3-t-butylamino-3-methyl-1-pentanol, which compound was purified by acetylation as set forth in Example III above. The acetate was in turn converted to the alcohol by the alcoholysis procedure set forth in the same example. 3-t-butylamino-3-methyl-1-pentanol hydrochloride thus prepared melted at about 120–121° C.

The free base can be prepared from the hydrochloride salt by dissolving the salt in water, adding alkali, and extracting the alkali-insoluble free base into ether. Evaporation of the ether leaves 3-t-butylamino-3-amino-1-pentanol as a residue which can be further purified by distillation.

EXAMPLE V

*Preparation of 3-isopropylamino-3-ethyl-1-pentanol*

Following the procedure of Example I, 3-isopropylamino-3-ethyl-1-pentene hydrochloride was converted to 3-isopropylamino-3-ethyl-1-pentanol by reaction with sodium borohydride, followed by treatment of the thus-formed product with alkaline hydrogen peroxide. The resulting reaction mixture was diluted with two volumes of ether. The ether layer was separated and extracted three times with ten percent aqueous hydrochloric acid, thus causing 3-isopropylamino-3-ethyl-1-pentanol, the free base formed in the above reaction, to pass into the acidic aqueous layer as the hydrochloride salt. The acidic aqueous solution was extracted with ether, the ether extract was discarded, and the aqueous layer was made basic by the addition of an excess of ten percent sodium hydroxide. 3-isopropylamino-3-ethyl-1-pentanol, being insoluble in the alkaline aqueous layer, separated and was extracted into ether. The ether extract was separated and dried, and the ether and volatile by-products of the rection were removed by fractional distillation in vacuo. The resulting residue, comprising 3-isopropylamino-3-ethyl-1-pentanol, was converted to the corresponding hydrochloride salt by the procedure of Example II. 3-isopropylamino-3-ethyl-1-pentanol hydrochloride thus prepared melted at about 41.5–42.5° C. after a three fold recrystallization from methyl ethyl ketone.

EXAMPLE VI

*Preparation of 3-t-butylamino-3-ethyl-1-pentanol*

Following the procedure of Example I, 3-t-butylamino-3-ethyl-1-pentene hydrochloride was reacted with sodium borohydride in diglyme to yield the corresponding tris (aminoalkyl)borane derivative. Reaction of this compound with alkaline hydrogen peroxide yielded 3-t-butylamino-3-ethyl-1-pentanol, which was converted to the corresponding hydrochloride salt by the method of Example II. 3-t-butylamino-3-ethyl-1-pentanol hydrochloride thus prepared melted at about 172.5–174° C. after recrystallization from methyl ethyl ketone.

I claim:

1. The method of synthesizing an α,α-disubstituted-γ-hydroxypropylamine which comprises reacting with sodium borohydride in an ethereal solvent an α,α-disubstituted aminopropene of the following formula:

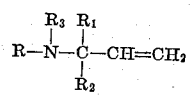

wherein R is a member of the group consisting of $C_1$–$C_5$ alkyl, phenyl, and phenyl-substituted $C_1$–$C_5$ alkyl;
$R_1$ and $R_2$ are members of the group consisting of $C_1$–$C_5$ alkyl, and phenyl; and $R_3$ is a member of the group consisting of hydrogen, methyl, and ethyl;
to form an organo-boron compound, and then decomposing said organo-boron compound with alkaline hydrogen peroxide to yield a compound of the formula:

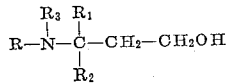

wherein R, $R_1$, $R_2$ and $R_3$ have the same significance as hereinabove.

References Cited

UNITED STATES PATENTS

| 2,363,081 | 11/1944 | Ringk | 260—584 X |
| 2,744,141 | 5/1956 | Hayes et al. | 260—584 |
| 3,203,981 | 8/1965 | Hargrove | 260—584 X |

FOREIGN PATENTS 876,465   9/1961   Great Britain.

CHARLES B. PARKER, *Primary Examiner.*

R. L. RAYMOND, *Assistant Examiner.*